United States Patent

[11] 3,609,569

[72] Inventor Ronald C. Todd
Somerville, N.J.
[21] Appl. No. 53,395
[22] Filed July 9, 1970
[45] Patented Sept. 28, 1971
[73] Assignee Solid State Scientific Devices Corporation
Montgomeryville, Pa.

[54] LOGIC SYSTEM
13 Claims, 19 Drawing Figs.

[52] U.S. Cl. .......... 328/201, 307/207, 307/208, 307/272, 307/291, 328/63, 328/92, 328/206
[51] Int. Cl. .......... H03k 3/26
[50] Field of Search .......... 307/203, 207, 208, 269, 272, 276, 289, 291; 328/63, 92, 201, 206

[56] References Cited

UNITED STATES PATENTS

| | | | |
|---|---|---|---|
| 3,278,758 | 10/1966 | Vroman | 307/208 |
| 3,458,825 | 7/1969 | Lagemann | 307/208 X |
| 3,509,381 | 4/1970 | Marshall, Jr. et al. | 307/291 X |
| 3,510,784 | 5/1970 | Weber | 307/208 X |
| 3,510,787 | 5/1970 | Pound et al. | 307/208 X |
| 3,551,827 | 12/1970 | Stopper | 307/289 X |

*Primary Examiner*—Stanley T. Krawczewicz
*Attorney*—Howson & Howson

ABSTRACT: A single-phase master/slave flip-flop circuit combines a pair of flip-flop networks which are mathematical duals. Each network includes a pair of gates connected in flip-flop arrangement with the inverted output of each providing the network outputs and being fed back as an input to the other gate in the flip-flop pair. The flip-flop gates in one network are AND gates and one input of each is an OR gate. This sequence of gates is reversed in the other network. It is possible to have the networks arranged in either order. Each input gate receives as an input a signal common to all four input gates and at least one other input signal. Other input signals to the input gates of one network are the output signals of the other network. The network outputs of said one network provide system outputs. Input signals to the input gates of the other network are system inputs. This circuit is applicable to RST, D, T, JK, flip-flop circuits and modifications thereof.

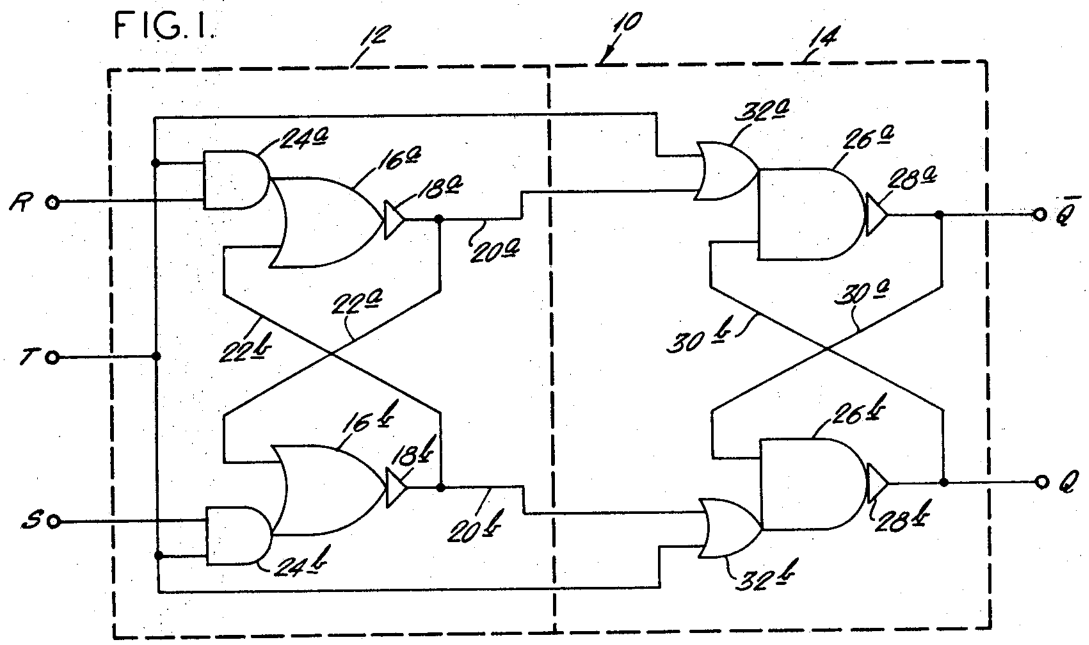
FIG. 1.
FIG. 1a.
| R | S | Q |
|---|---|---|
| 0 | 0 | NO CHANGE |
| 0 | 1 | 1 |
| 1 | 0 | 0 |
| 1 | 1 | NOT ALLOWED |
FIG. 2a.
| R | S | Q |
|---|---|---|
| 0 | 0 | NOT ALLOWED |
| 0 | 1 | 1 |
| 1 | 0 | 0 |
| 1 | 1 | NO CHANGE |
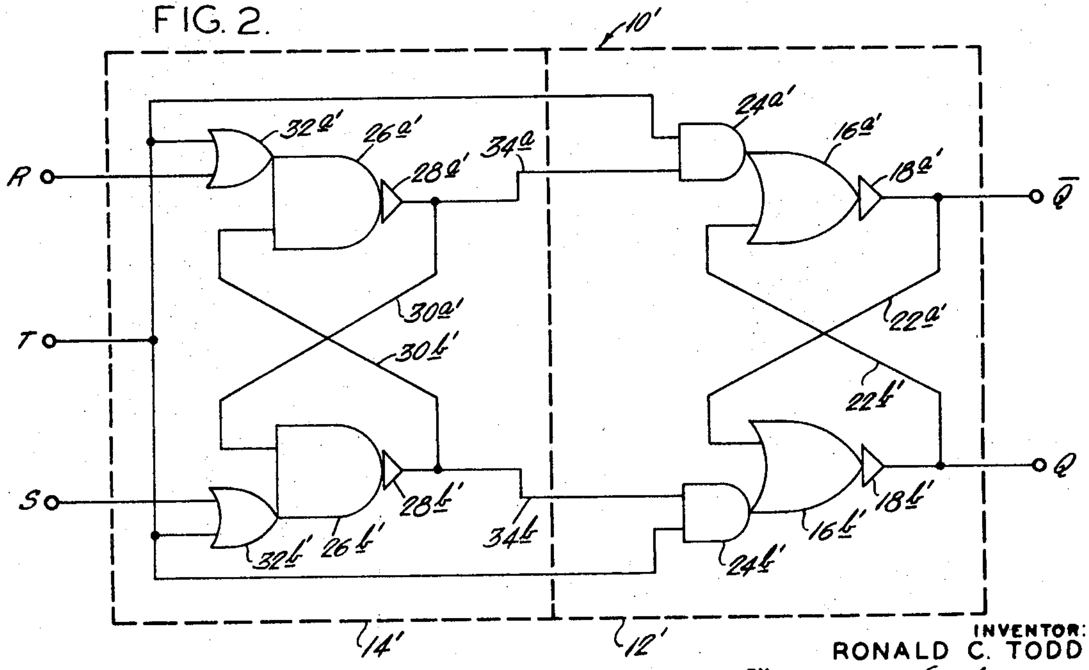
FIG. 2.
INVENTOR:
RONALD C. TODD
BY Howson & Howson
ATTYS.

FIG. 2b.
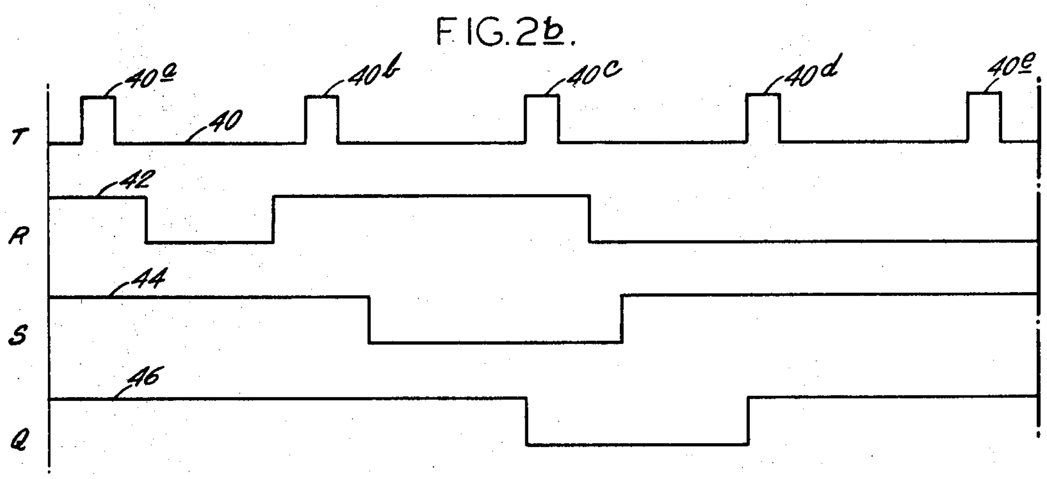
FIG. 3.
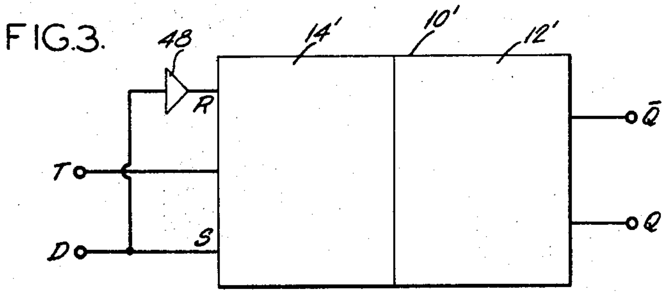
FIG. 3a.
| D | Q |
|---|---|
| 1 | 1 |
| 0 | 0 |
FIG. 4.
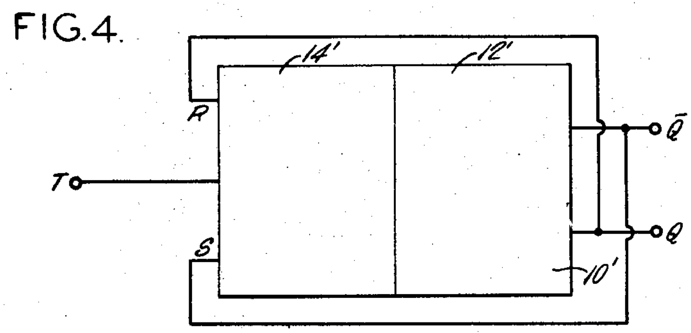
FIG. 4a.
| T | Q |
|---|---|
| 1 | TOGGLES |
| 0 | NO CHANGE |
FIG. 4b.
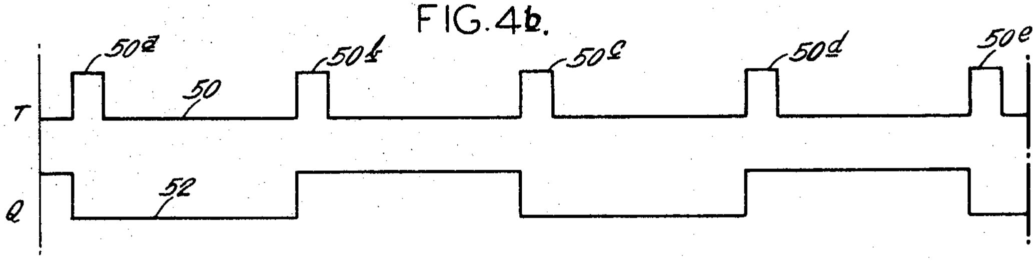
INVENTOR:
RONALD C. TODD
BY
Howson & Howson
ATTYS.

FIG. 5.
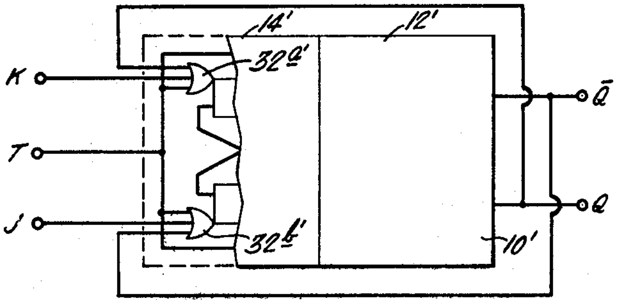
FIG. 5a.
| J | K | Q |
|---|---|---|
| 0 | 0 | TOGGLE |
| 0 | 1 | 0 |
| 1 | 0 | 1 |
| 1 | 1 | NO CHANGE |
FIG. 6.
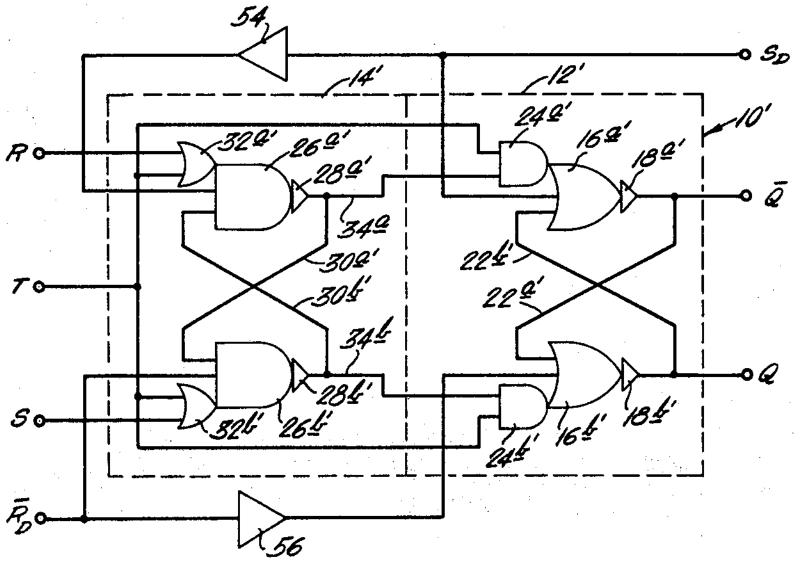
FIG. 6a.
| $S_D$ | $\bar{R}_D$ | Q |
|---|---|---|
| 0 | 0 | 0 |
| 0 | 1 | NO CHANGE |
| 1 | 0 | NOT ALLOWED |
| 1 | 1 | 1 |
FIG. 6b.
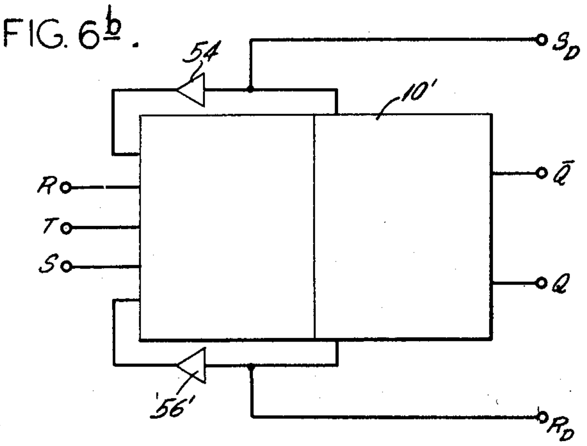
INVENTOR:
RONALD C. TODD
BY
Howson & Howson
ATTYS.

FIG. 6c.
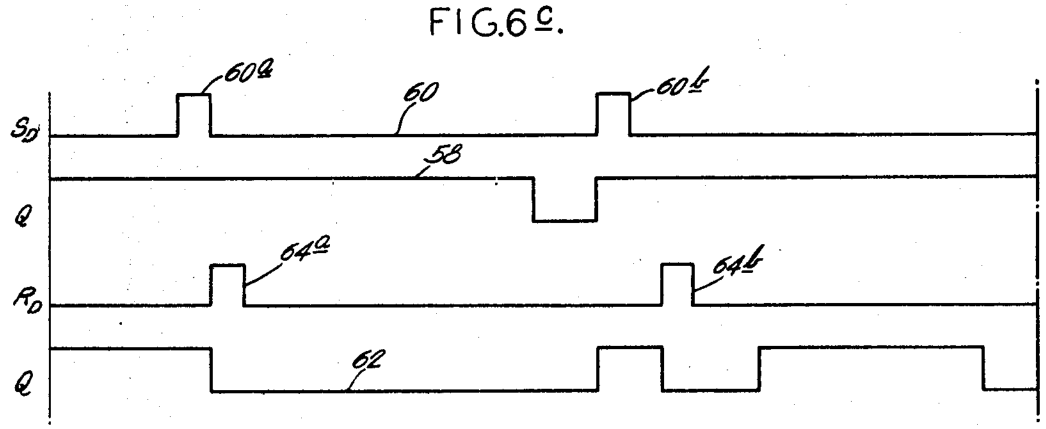
FIG. 7.
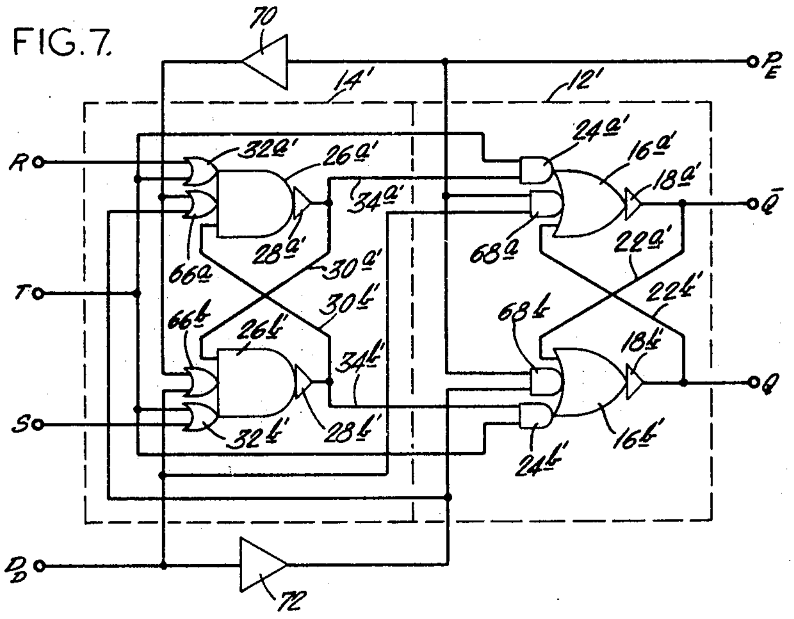
FIG. 7a.
| $P_E$ | D | Q |
|---|---|---|
| 0 | 0 | NO CHANGE |
| 0 | 1 | NO CHANGE |
| 1 | 0 | 0 |
| 1 | 1 | 1 |
FIG. 7b.
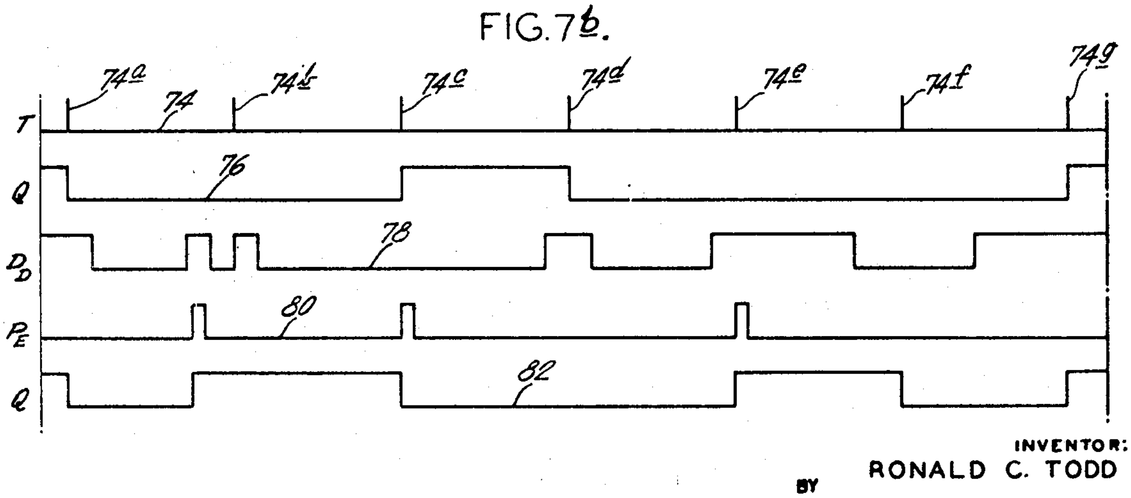
INVENTOR:
RONALD C. TODD
BY
Howson & Howson
ATTYS.

LOGIC SYSTEM

The present invention relates to a logic system and more specifically to single-phase master/slave flip-flop logic circuits. In particular, circuits of this type have particular application in time referenced systems providing a delay and providing a window or shutter effect permitting a look at an input upon a given signal after a delay.

The systems of the present invention provides a novel cell or logic package which will always perform in a predetermined way, depending upon the signal on the input terminals at a given time. The system upon occurrence of a predetermined "clock" signal condition, say a positive going transition, applied to an appropriate terminal will transfer information from a first network into a second and upon another "clock" signal condition e.g., negative going transition) will give an indication of the output from the second network. Such systems are highly valuable as integrated circuits for performing logical functions, and this particular system has the advantage that it eliminates a two-phase clock and at the same time operates theoretically at twice the speed of conventional flip-flop designs. Furthermore, its operation is fully static and is very highly insensitive to clock transition times. It is compatible with the CMOS technology and easily expanded in scope, beyond even the RST-type flip-flop, the JK-type flip-flop, the D-type flip-flop, the T-type flip-flop and others described below and easily permits the addition of direct set, reset or jammed preset functions. This system can be made highly reliable and lends itself to ease of layout in integrated circuit technology and provides simplicity of operation, coupled with high speed.

More specifically, the present invention relates to a system composed of two networks having three system inputs and two system outputs. Two similar networks are employed. One arbitrarily called "first network" has a pair of first network or gates, each having a pair of input terminals and an output terminal. A pair of first network inverters each has its input terminal connected to the respective output terminal of the first network OR gates. Each inverter provides at its output terminal a first network terminal and a feedback to an input terminal of the first network OR gate other than the one to which its input terminal is connected. A pair of first network AND gates, each having an output terminal connected to an input terminal of different ones of the first network OR gates. One of the pair of input terminals of the AND gates is a separate network input terminal, and the other input terminal of each of the AND gates is connected to a common system input.

A "second network" employs a pair of second network AND gates, each having a pair of input terminals and an output terminal. A pair of second network inverters has input terminals connected to the respective output terminals of the second network AND gates and each, respectively, providing at its output terminal a second network output terminal and a feedback to an input terminal of the second network AND gate other than the one to which its input terminal is connected. Each of a pair of second network OR gates has an output terminal connected to an input terminal of different ones of the second network AND gates and a pair of input terminals, one of which input terminals of each OR gate is a separate network input terminal and the other of which input terminals are both connected to the common system input. The network output terminal of one of said first and second networks is connected to the network input terminals of the other network. The network input terminals of that one network serve, as the other two system input terminals, and the output terminals of the other network serve as the system output terminals.

For a better understanding of the present invention reference is made to the accompanying drawings in which FIG. 1 shows schematically a single-phase master/slave RST flip-flop system;

FIG. 1*a* shows a truth table for the system of FIG. 1;

FIG. 2 shows a similar single-phase master/slave RST flip-flop system of a slightly variant form;

FIG. 2*a* shows a truth table for the system of FIG. 2;

FIG. 2*b* is a diagram with respect to time of voltages appear on various indicated terminals;

FIG. 3 shows a schematic single-phase master/slave D-type flip-flop system showing modifications required to the system of FIG. 2 to convert from an RST to a D-type;

FIG. 3*a* shows a truth table for the system of FIG. 3;

FIG. 4 is another schematic showing of a single-phase master/slave T type of flip-flop system showing modifications required to the system of FIG. 2 to convert from RST- to T-type flip-flop;

FIG. 4*a* shows a truth table for the system of FIG. 4;

FIG. 4*b* shows a diagram with respect to time of voltages applied at input and output terminals;

FIG. 5 is a schematic diagram of a single-phase master/slave JK flip-flop system showing modifications required in the diagram of FIG. 2 to convert from an RST- to a JK-system;

FIG. 5*a* shows a truth table for the system of FIG. 5;

FIG. 6 shows schematically a single-phase master/slave $S_D$ $R_D$ flip-flop system;

FIG. 6*a* shows a truth table for the system of FIG. 6;

FIG. 6*b* is a schematic diagram showing a modification of FIG. 6;

FIG. 6*c* shows a plot of voltages at the various terminals listed with respect to time for the system of FIG. 6*b*;

FIG. 7 shows schematically a single-phase master/slave $P_E$ $D_D$ flip-flop system;

FIG. 7*a* shows a truth table for the system of FIG. 7;

FIG. 7*b* shows a diagram of voltages applied at various terminals at successive times.

Referring first to FIG. 1, the system is shown within a large dashed box generally designated 10 having three system inputs R, S and T and having two system outputs Q and $\bar{Q}$. The system is composed of two networks which are shown in the boxes 12 and 14 subdivided from box 10. Since network 12 receives the system input, in this embodiment it is the "-master" network. Since network 14 receives its input in part from master network 12 and provides the system output, in this embodiment, network 14 is a "slave" network. The first network 12 employs a pair of OR gates **16*a* and 16*b* each having a pair of input terminals and an output terminal. The output terminal of each of the OR gates 16*a* and 16*b* is connected to the input terminal of an inverter 18*a* and 18*b*, respectively. Each of the inverters 18*a* and 18*b* provides at its output terminal a first network output terminal connected to second network 14 through connections 20*a* and 20*b*, respectively. The output terminal of the inverters 18*a* and 18*b* are also connected by feedback connections 22*a* and 22*b* to an input terminal of the first network and the gate other than the one to which its input terminal is connected. That is, inverter 18*a* is connected by feedback path 22*a* to the input of OR gate 16*b* and inverter 18*b* is connected by feedback 22*b* to the input of OR gate 16*a*. The other input terminal of OR gates 16*a* and 16*b* are respectively connected to the output terminals of a pair of first network AND gates 24*a* and 24*b*. AND gates 24*a* and 24*b* each have two input terminals. One input terminals of each is connected to the common input T. The other input and AND gate 24*a* is connected to input R, and the other input of AND gate 24*b*** is connected to input S.

In the second network 14 a pair of AND gates **26*a* and 26*b* have their output terminals connected to the input terminals of inverters 28*a* and 28*b*, respectively. The output terminals of inverters 28*a* and 28*b* constitute the system output terminals and provide the system output signals $\bar{Q}$ and Q, respectively. The output of inverters 28*a* and 28*b* are also feedback coupled to the inputs of AND gates 28*a* and 28*b*. Inverter 28*a* is coupled back through feedback path 30*a* to an input of AND gate 26*b*, and inverter 26*b* is coupled by feedback path 30*b* to an input of AND gate 26*a*. The AND gates 26*a* and 26*b* each have other input terminal connected to the output terminal of OR gates 32*a* and 32*b*, respectively. One input terminal of OR gate 32*a* is connected through connection 20*a*, one output terminal of network 12. Similarily one input to OR gate 32*b* is connected through connection 20*b*, the other output terminal of network 12. The other input terminal of each of the OR gates 32*a* and 32*b*** is connected to the common system input T.

Referring to the truth table FIG. 1*a*, it will be observed that signals are not permitted on both the R and S inputs and that when no signal occurs on both the R and S inputs, there will be no change in the signal at the output. This system is designed such that the output changes on the falling edge of the input triggering signal T. The output $\overline{Q}$ is the inverse of Q.

Assume that the following input conditions exist where "-true" represents a signal or binary 1 and "false" represents no signal or a binary 0: T terminal is true (1), R and S terminals may be either or both false 0) but not both true (1). AND gates 24*a* and 24*b*, being enabled by T force a set of conditions on OR gates 16*a* and 16*b* which are dependent on R and S. For R true (1) and S false (0) the output of gate 16*a* on line 20*a* will be true (1) and the output of inverter 18*a* on line 20*a* will be false (0). For R false (0) and S true (1), the output of gate 16*b* will be true (1) and the output of inverter 18*b* on line 20*b* will be false (0). For both R and S false (00, the states of gates 16*a* and 16*b* outputs will not change from their previous states. Thus, the network output on lines 20*a* and 20*b* remains unchanged.

As T becomes false (0), the outputs of OR gates 16*a* and 16*b* will not change due to their cross-coupling feedback. At this point the output of the network on line 20*a* is true (1), and on line 20*b* is false (0), or alternatively 20*b* is true (1) and 20*a* is false (0); both will never be true or false together. T being false (0) now enables OR gates 32*a* and 32*b* to force a set of conditions on AND gates 26*a* and 26*b* in a manner similar to that method involving gates 24*a*, 24*b*, 16*a* and 16*b*. If network output 20*b* is true (1), output 20*a* is false (0), Q will be false (0) and will be true (1). When T becomes true again, Q and $\overline{Q}$ will not change due to the cross-coupling feedback.

The principal difference between the circuit and the typical implementation of a master/slave flip-flop is that no negation of T is required to enable the slave network 14. This negation in practice causes unnecessary time delay in the typical circuits. However, the present invention does away with the necessity for negation by relying on the mathematical principle of duality to cause an "apparent" negation. This "apparent" negation adds no unwanted time delays to the circuit.

Referring now to FIG. 2, it will be observed that the system shown is quite similar to that of FIG. 1 except that the networks have been reversed in position and therefore in their master/slave relationships: that is, the system 10' the system inputs R and S are inputs to network 14' instead of network 12 as in FIG. 1. Network 14'corresponds exactly to network 14 and therefore, corresponding elements of the network have been given similar number designators with the addition of primes thereto. In stead of network 12 feeding network 14 as in FIG. 1, network 14' feeds network 12' through connections 34*a* and 34*b* which connect the outputs of network 14' to the inputs of network 12'.

Network 12' is identical to network 12 of FIG. 1 and, therefore, the same number designators used in FIG. 1 are employed to indicated corresponding structure. In this case, however, the outputs of network 12' instead of feeding the input of network 14' constitute the system outputs $\overline{Q}$ and Q.

Substitution of one network for the other does not change the functioning of the individual networks, nor does it change the functioning of the system as a whole, as seen in the truth table of FIG. 2*a*, which shows identical system responses to that shown in FIG. 1*a* for the system of FIG. 1.

Referring to FIG. 2*b*, a series of plots of voltage against time are shown which indicate the voltages on specified terminals at successive corresponding times. Potentials on the R-, S-, T-, and Q-terminals are shown, it being understood that the $\overline{Q}$ terminal will be just the opposite of the Q-terminal.

It should be understood that system outputs Q and $\overline{Q}$ for the systems of FIGS. 1 and 2, and all other circuits to be described hereafter are all responsive to the clock voltage T, the first curve of FIG. 2*b*, and change on a predetermined portion of the clock train. Characteristically the clock potential applied to terminal T has a repetitive pattern wherein pulses of the same size are repeated at the same period, hence the designation clock signifying division of time into equal increments.

The function of the clock, in the systems of FIGS. 1 and 2, and in systems described hereafter is to permit periodic sampling of the voltage on the respective terminals at a selected time. The purpose of the RST circuit is to observe relationships of the potential representing 1 or 0 on terminals R and S at a given time. This observation occurs when T increases in voltage, i.e., when T moves from false (0) toward true (1). At that time the information at the R- and S-terminals is effectively transferred into the master network 12 of the total system 10. When T changes back toward false (0) the transfer occurs from the master network 12 to the slave network 14. Thus, effectively, the output from the system on the Q-terminals is a time delayed duplicate of the input on the R and S terminals. This relationship is stable unconditionally assuming power is maintained on network, that is, after T becomes true (1), outputs are unconditionally stable unless the output T makes a second transition to false (0). When T changes to false (0) the output of network 12 or inputs to network 14 along connections 20*a* and 20*b* in FIG. 1, or network 14' to 12' along connections 34*a* and 34*b* in FIG. 2, are unconditionally stable, until the clock T makes another transition toward true (1). Therefore R and S are unconditionally stable or locked into the network until the clock T makes a second transition to false (0). Thus, examining FIG. 2*b*, when T goes positive in the first pulse 40*a* both R (plot 42) and S (plot 44) are true (1). Therefore the output at Q-curve 46 is also true (1). R (plot 42) goes false (0) before the second T pulse 40*b*, but returns to true (1) by the time pulse 40*b* occurs and, therefore, Q remains true (1) at that time. Thereafter, however, S becomes false (0) so that, upon the occurrence of pulse 40*c*, Q (plot 46) turns false (0), as one would expect from the truth table, FIGS. 1*a* or 2*a*. In the course of the time between pulses 40*c* and 40*d* potentials on terminals R and S reverse at different times, which are not significant. However, they remain false (0) and true 1) at the time the pulse 40*d* occurs so that Q becomes true (1). There are no changes in R and S when pulse 40*e* occurs and therefore no change occurs in the output Q. These curves show the application in a time system of the master set of networks of FIG. 2.

FIG. 3 illustrates modifications to the network 10' of FIG. 2 whereby the system is converted from an RST-system to a D-system. This is done by coupling R- and S-terminals to a common D input terminal. Terminal S is connected directly to D but terminal R is connected to D by the inverter 48 so that the potential appearing at R is D. Thus in the D-system $D=S=\overline{R}$. With this in mind the RST truth table applies. Therefore, reduced to simpler terms, if D is 1, Q is 1 and if D is 0, Q is 0 as shown in the truth table of FIG. 3*a*. The importance of Q, it must be remembered, is that it is time delayed from D.

Referring next to FIG. 4, the T-type master/slave flip-flop is shown and it can be seen that in this particular system the system 10' of FIG. 2 is employed wherein the output Q is fed back as the input to S and the output Q is fed back as the input to R. This feedback produces a "toggling" effect in which changes necessarily occur on every positive going T-pulse. The table of FIG. 4*a* is not strictly a truth table, but simply illustrates that a change occurs only on a change to true (1), or a positive going change, and that there is no change on a false (0) or negative going change. This is better illustrated in FIG. 4*b* wherein the clock T is shown as plot 50. On the positive going portion of pulse 50*a* the potential at Q changes from true (1) to false (0) and does not change back as the pulse 50*a* drops back to false (0). Q does change again on the next pulse 50*b*, however, as T goes from false (0) to true (1). The potential is reversed in the same manner on every subsequent pulse 50*c*, 50*d*, 50*e*, etc. and thus provides the toggling action.

The JK-type network shown in FIG. 5 departs from the technique of FIGS. 3 and 4 since network 14' is slightly modified by adding an additional output to input OR gates 32*a'*and 32*b'*Comparison with FIG. 4 indicates that the system is a T-type flip-flop with JK-inputs applied to the new terminals of gates 32*a'* and 32*b'*. Thus as seen from the truth table FIG. 5*a*, if J and K are both false (0), or no signal appears at these terminals the network toggles, or changes state on each T-pulse, just as the T-network of FIG. 4 did. However, the appearance of true (1) on terminal K, while false (0) remains on terminal J, will produce an output of false (0) on terminal Q. Conversely, if the signal on terminal J is true (1) and that on K is false (0) the output at Q will be true (1). On the other hand, if the signal on both the J- and K- terminals is true (1), no change will occur in the output Q and toggling is prevented.

From what has been described above, it can be inferred that the system can be modified to be made much more elaborate, and such modification is done in the embodiments of FIGS. 6 and 7, it being understood that additional embodiments even more complicated are possible.

A modified RST-circuit is shown in FIG. 6 using a circuit again of the type of FIG. 2, and the number designators from that diagram to identify corresponding network components and connection. However, the circuit is modified by internal additions which permit the injection at any time of a change in the content of the system on a random access basis. This is accomplished by feeding pulses $S_D$ and $\bar{R}_D$ into both networks 12' and 14' through the terminals shown. Since the pulses are fed into both networks 14' and 12', an inverter is required so that inverted signals are supplied simultaneously to the respective networks. As shown in FIG. 6 the input $S_D$ is fed to the OR gate 16a' as an additional input which can change that gate at any time regardless of the status of clock T. However $\bar{S}_D$, not $S_D$ must be fed to additional input terminal in AND gate 26a in network 14'. Therefore $S_D$ must be first passed through inverter 54 to generate $\bar{S}_D$. Similarly, the $\bar{R}_D$ signal is fed directly into the AND gate 26b' but is fed by way of inverter 56 into an additional terminal of the OR gate 16b' of network 12'. The signals $S_D$ represent direct setting capability, whereas $\bar{R}_D$ represents direct resetting capability. A true (1) signal applied to input $S_D$ will cause the same conditions to occur as a random access injection as would occur were true (1) present at the S terminal. If a false (0) signal is interjected at $\bar{R}_D$, it will cause a resetting which would be the equivalent of a true (1) on the $R_D$ at the time the clock signal occurred. The truth table in FIG. 6a indicates that when both $S_D$ and $\bar{R}_D$ are false (0), Q will remain false (0) but when $S_D$ and $\bar{R}_D$ are both true (1), Q will be true (1).

Referring to the plots of time versus potential on the indicated terminals of FIG. 6b, it will be seen then that when the output Q is true (1), in curve 58 (which corresponds to 46 in FIG. 2b) the occurrence in curve 60 $S_D$ of a pulse 60a will have no effect. The plot of Q 58 is a presumed plot Q which would occur using the normal RST input patterns according to the teaching of FIG. 2b. However, after Q becomes false (0), the occurrence of an $S_D$ pulse 60b will bring Q back to true (1). Just the opposite is true in the case of Q-curve 62 where the occurrence of a true going pulse 64a in curve 64 representing signal $R_D$ will cause Q to return to false (0). Should Q be returned to true the occurrence of another $R_D$ pulse 64b will again cause the Q-potential 62 to drop to false (0).

FIG. 6b illustrates how the system of FIG. 6 may be changed from a system employing $\bar{R}_D$ to a system employing $R_D$ so that the interjection of a false (0) on $R_D$ corresponds to interjection of a true (1) at $\bar{R}_D$. The system is precisely the same as that of FIG. 6 except that the direction of inverter 56' is reversed from the direction of the inverter 56 and the terminal for the input $R_D$ is applied on the opposite side of the circuit 56'.

The system of FIG. 7 enables the sampling of random data and impressing it on the system on command. It is similar to the sampling operation with the RST and again the network is basically the same as that of FIG. 2 using the same number designators for corresponding parts but with added modifications to the system.

There is an added input AND gate 26a' in master network 14', which is an additional input OR gate 66a. Similarly, there is an additional input to AND gate 26b' which is an additional input OR gate 66b. There are similar modifications to network 12', except that in addition to the input AND gate 24a' there is an additional input AND gate 68a as an input to OR gate 16a'; likewise there is an additional input AND gate input 68b to OR gate 16b'. The $P_E$ signal is applied to the input AND gates 68a and 68b in the slave network 12'; that signal is inverted by inverter 70 and applied to OR gates 66a and 66b as $\bar{P}_E$. By contrast, the $D_D$ signal supplies one of the inputs of input OR gate 66b in network 14' and one of the inputs of input AND gate 68a in network 12'. Inverter 72 connected to the $D_D$ terminal produces a $\bar{D}_D$ signal which is applied to one of the inputs of input OR gate 66a in network 14' and one of the inputs of input AND gate 68b in network 12'.

The truth table of FIG. 7 applies to the network of FIG. 7. A change to be enforced at a random time only when the signal $_E$ is true (1). At such time should the signal D be false (0) the output Q will be false (0) and should $D_D$ be true (1) the output at Q will be true (1). In the meantime the system is operated upon regularly by the clock T responding to the signals at the R- and S-terminals.

The effect of signals $P_E$ and $D_D$ are diagrammed at FIG. 7. In this particular case, the clock pulse T involves an impulse with essentially no pulse width. Pulse train 74 has pulses 74a, 74b, 74c, 74d, 74e, 74f and 74g. The plot of Q 76 immediately under T is a presumed plot of Q which would occur using the normal RST input patterns according to the teaching of FIG. 2b. Plot 78 shows an arbitrary plot of $D_D$ and plot 80 represents an arbitrary plot of $P_E$. Using these plots curve 82 shows modified results of the composite effect the signals on $P_E$ and $D_D$ on plot 76, which can be anticipated by reference to the truth table 7a.

From the foregoing it will be seen that the present invention is capable of many modifications to accomplish various desired effects. Additional modifications not shown are possible and will occur to those skilled in the art. All such systems and modifications within the scope of the claims are intended to be within the scope and spirit of the present invention.

I claim:

1. A system composed of two networks having three system inputs and two system outputs comprising a pair of first network OR gates, each having a pair of input terminals and an output terminal, a pair of first network inverters having input terminals connected to the respective output terminals of the first network OR gates and each, respectively, providing at its output terminal a first network output terminal and a feedback to an input terminal of the first network OR gate other than the one to which its input terminal is connected, a pair of first network AND gates, each having an output terminal connected to an input terminal of different ones of the first network OR gates and a pair of input terminals, one of which input terminals of each AND gate is a separate network input terminal and the other of which input terminals are both connected to a common system input, a pair of second network AND gates, each having a pair of input terminals and an output terminal, a pair of second network inverters having input terminals connected to the respective output terminals of the second network AND gates and each, respectively, providing at its output terminal a second network output terminal and a feedback to an input terminal of the second network AND gate other than the one to which its input terminal is connected, and a pair of second network OR gates, each having an output terminal connected to an input terminal of different ones of the second network AND gates and a pair of input terminals, one of which input terminals of each OR gate is a separate network input terminal and the other of which input terminals are both connected to a common system input, the network output terminals of one network being connected to the network input terminals of the other network and the network input terminals of said one network serving as the other system input terminals and the other network output terminals serving as the system output terminals.

2. The system of claim 1 in which the networks are so connected that the first network provides the system input terminals and the second networks provides the system output terminals.

3. The system of claim 1 in which the networks are so connected that the second network provides the system input terminals and the first network provides the system output terminals.

4. The system of claim 1 in which the separate network input terminals serving as system input terminals are connected together by a signal inverter so that the signal applied to one system input terminal is the inverted signal of the signal applied to the other system input terminal.

5. The system of claim 1 in which a toggling effect is achieved by feedback cross-coupling wherein a portion of each system of gates in series is connected back to the other system of gates in series.

6. The system of claim 5 in which the output terminals terminating one system of gates in series is coupled back to the system input terminals feeding the other gates in series.

7. The system of claim 5 in which additional system input terminals are provided to the same gate whose separate input terminals provide the system input terminals.

8. The system of claim 1 in which additional inputs are provided, respectively, for at least one of the first network OR gates and at least the corresponding one of the second network AND gates in the series with at least one first network OR gates.

9. The system of claim 8 in which an inverter interconnects said at least one additional terminal so that a signal applied to one terminal is applied to the other terminal as the same signal inverted.

10. The system of claim 8 in which both first network OR gates and both second network AND gates have additional input terminals and inverters connect together the additional input terminals of those gates which are in series so that the signal applied to one additional terminal of the series is applied to the other of the same series as the same signal inverted.

11. The system of claim 1 in which an additional AND gate has its output connected as another input to each of the first network OR gates and an additional OR gate has its output connected as another input to each of the second network AND gates.

12. The system of claim 11 in which each additional input gate has two inputs receiving different combinations of two potential signals and the inverted signals of said two potential signals.

13. The system of claim 12 in which inverters are employed between terminals receiving respectively a signal and the inverted signal to accomplish said inversion.